(12) United States Patent
Park et al.

(10) Patent No.: US 10,596,524 B2
(45) Date of Patent: Mar. 24, 2020

(54) HOLLOW FIBER MEMBRANE

(71) Applicant: LG CHEM, LTD., Seoul (KR)

(72) Inventors: Jooyoung Park, Seoul (KR); Jongdeok Kim, Seoul (KR); Junseok Lee, Seoul (KR)

(73) Assignee: LG CHEM, LTD., Seoul (KR)

( * ) Notice: Subject to any disclaimer, the term of this patent is extended or adjusted under 35 U.S.C. 154(b) by 371 days.

(21) Appl. No.: 15/038,931

(22) PCT Filed: Jul. 23, 2014

(86) PCT No.: PCT/KR2014/006719
§ 371 (c)(1),
(2) Date: May 24, 2016

(87) PCT Pub. No.: WO2015/093705
PCT Pub. Date: Jun. 25, 2015

(65) Prior Publication Data
US 2017/0001152 A1 Jan. 5, 2017

(30) Foreign Application Priority Data

Dec. 20, 2013 (KR) .................. 10-2013-0160586

(51) Int. Cl.
*B01D 69/08* (2006.01)
*B01D 71/68* (2006.01)
(Continued)

(52) U.S. Cl.
CPC ........... *B01D 69/08* (2013.01); *B01D 61/025* (2013.01); *B01D 61/027* (2013.01);
(Continued)

(58) Field of Classification Search
CPC .... B01D 69/08; B01D 61/025; B01D 61/027; B01D 61/145; B01D 69/02; B01D 69/12;
(Continued)

(56) References Cited

U.S. PATENT DOCUMENTS 4,629,563 A   12/1986   Wrasidlo
5,895,573 A    4/1999   Scharstuhl
(Continued)

FOREIGN PATENT DOCUMENTS

CN   1545433    11/2004
CN   102481524   5/2012
(Continued)

OTHER PUBLICATIONS

European Search Report dated Jul. 25, 2017 issued in Application No. 14870848.0.
(Continued)

*Primary Examiner* — James C Goloboy
(74) *Attorney, Agent, or Firm* — Rothwell, Figg, Ernst & Manbeck, P.C.

(57) ABSTRACT

The present invention relates to a hollow fiber membrane. Provided is a cylindrical hollow fiber membrane having an inside in which a hollow part is formed along an axial direction, the hollow fiber membrane including: a first layer positioned at the outermost part so as to be exposed to the outside, and having pores formed therein to make raw water enter and leave via the pores; a second layer formed on the inside of the first layer to filter out contaminants from raw water as the raw water passes through; and a third layer to optionally separate or filter out contaminants from the raw water introduced through the second layer or introduced from the hollow part, wherein the first layer to the third layer are integrally formed; the porosity of the first layer is greater than the porosity of the third layer; and porosities are gradually decreased from the first layer to the third layer.

5 Claims, 6 Drawing Sheets

(51) Int. Cl.
  *B01D 61/02* (2006.01)
  *B01D 61/14* (2006.01)
  *B01D 69/02* (2006.01)
  *B01D 69/12* (2006.01)

(52) U.S. Cl.
  CPC ......... *B01D 61/145* (2013.01); *B01D 61/147* (2013.01); *B01D 69/02* (2013.01); *B01D 71/68* (2013.01); *B01D 69/12* (2013.01); *B01D 2325/02* (2013.01); *B01D 2325/022* (2013.01); *B01D 2325/04* (2013.01); *B01D 2325/24* (2013.01)

(58) Field of Classification Search
  CPC ............... B01D 71/68; B01D 2325/02; B01D 2325/022; B01D 2325/04; B01D 2325/24
  See application file for complete search history.

(56) References Cited

U.S. PATENT DOCUMENTS

| | | | |
|---|---|---|---|
| 6,663,805 B1 | 12/2003 | Ekiner et al. | |
| 2002/0011443 A1* | 1/2002 | Komatsu | B01D 63/024 210/650 |
| 2006/0107639 A1* | 5/2006 | Hamlin | B01D 29/21 55/498 |
| 2012/0125850 A1* | 5/2012 | Fujimura | B01D 69/082 210/650 |
| 2012/0325746 A1 | 12/2012 | Tamai et al. | |
| 2013/0092622 A1 | 4/2013 | Kas et al. | |
| 2013/0340613 A1* | 12/2013 | Krupnikov | B01D 53/0407 95/90 |
| 2016/0030892 A1 | 2/2016 | Tamai et al. | |

FOREIGN PATENT DOCUMENTS

| | | |
|---|---|---|
| EP | 2 221 102 | 8/2010 |
| JP | S61-200805 | 9/1986 |
| JP | H02-251233 | 10/1990 |
| JP | 3868479 B2 | 1/2007 |
| JP | 2007-289886 | 11/2007 |
| JP | 2009-536090 | 10/2009 |
| JP | 2010-506709 | 3/2010 |
| JP | 4531395 B2 | 8/2010 |
| JP | 2011-078920 | 4/2011 |
| JP | 5097298 B2 | 12/2012 |
| KR | 10-2008-0071015 A | 8/2008 |
| KR | 10-0861078 | 9/2008 |
| WO | WO 03/026779 | 4/2003 |
| WO | WO 2007/022576 | 3/2007 |
| WO | WO 2011/021300 A1 | 2/2011 |
| WO | WO 2013/039456 | 3/2013 |

OTHER PUBLICATIONS

Australian Office Action dated Jul. 31, 2017 issued in Application No. 2014367656.
Japanese Office Action dated Aug. 15, 2017 issued in Application No. 2016-535685.
Australian Examination Report dated Nov. 14, 2016 issued in Application No. 2014367656.
International Search Report (with English translation) and Written Opinion dated Nov. 27, 2014 issued in Application No. PCT/KR2014/006719.
Japanese Notice of Allowance dated Dec. 5, 2017 issued in Application No. 2016-535685.
Chinese Office Action dated May 15, 2017 issued in Application No. 201480068987.9 (with English Translation).

* cited by examiner

HOLLOW FIBER MEMBRANE

CROSS-REFERENCE TO RELATED PATENT APPLICATIONS

This application is a U.S. National Stage Application under 35 U.S.C. § 371 of PCT Application No. PCT/KR2014/006719, filed Jul. 23, 2014, which claims priority to Korean Patent Application No. 10-2013-0160586, filed Dec. 20, 2013, whose entire disclosures are hereby incorporated by reference.

TECHNICAL FIELD

The present invention relates to a hollow fiber membrane, and more particularly, to a hollow fiber membrane whose porosity is different depending on the depth of the cross-section.

BACKGROUND ART

In general, hollow fiber membranes are prepared by using a non-solvent phase separation method or a thermally induced phase separation method. Hollow fiber membranes produced by the aforementioned method are classified into a microfiltration membrane (MF), a ultrafiltration membrane (UF), a nanofiltration membrane (NF), and a reverse osmosis membrane (RO).

A typical hollow fiber membrane has the outermost layer and the innermost layer, and these parts are responsible for the removal performance of a contamination source as an active layer. Further, the hollow fiber membrane exhibits a difference in permeability depending on the porosity of the hollow fiber membrane, and when the cross-sectional structure of the hollow fiber membrane has a low porosity, the hollow membrane has a low permeability and a high strength, but in contrast, when the structure has a high porosity, the hollow fiber membrane exhibits a high permeability, but shows a low strength.

Conventional hollow fiber membranes are intended to minimize the filtration pressure loss by increasing the porosity of the cross-section of the hollow fiber membrane in order to increase the permeability, but only result in a reduction in tensile strength and breaking strength of the hollow fiber membrane. In addition, efforts have been made to even remove fine contaminants by decreasing the porosity of the cross-section of the hollow fiber membrane in order to enhance the removal performance of the contaminants, but the filtration pressure loss is increased, so that the permeability rapidly decreases, and the economic loss was enormous in order to utilize this. Various methods have been tried to overcome this, but it has been difficult to increase the water permeability by minimizing the filtration pressure loss, and simultaneously improve the removal rate and the strength.

DISCLOSURE OF THE INVENTION

Therefore, an object of the present invention is to provide a hollow fiber membrane which increases the breaking strength and the tensile strength and simultaneously improves the permeability by allowing the porosity of the inside cross-section to be different depending on the depth.

Another object of the present invention is to provide a hollow fiber membrane which may decrease the filtration pressure loss.

To achieve these and other advantages and in accordance with the purpose of the present invention, as embodied and broadly described herein, there is provided a cylindrical hollow membrane having a hollow part formed therein along an axial direction, the hollow fiber membrane including: a first layer positioned at the outermost part so as to be exposed to the outside, and having pores formed therein to make raw water enter and leave via the pores; a second layer formed on the inside of the first layer to filter out contaminants from raw water as the raw water passes through; and a third layer to optionally separate or filter out contaminants from the raw water introduced through the second layer or introduced from the hollow part, wherein the first layer to the third layer are integrally formed; the porosity of the first layer is greater than the porosity of the third layer; and porosities are gradually decreased from the first layer to the third layer.

The first layer may have a porosity of 30 to 80%, and may be formed at a position within 20 μm towards the inside from the outermost part.

The second layer may have a porosity of 25 to 65%.

The third layer may have a porosity of 25% or less, may have a thickness which is 10% or less of the thickness of the hollow fiber membrane, and may be formed within 20 μm towards the outside from the outermost part of the hollow part in a radial direction.

The hollow fiber membrane may be at least one of polysulfone, polyether sulfone, or a polymer using the same.

The hollow fiber membrane may have a thickness of 50 to 400 μm.

The first layer to the third layer may have a network structure.

The third layer has an average pore size of 50 nm or less, or may have an average pore size of 20 nm or less.

Further, according to an exemplary embodiment of the present invention, provided is a cylindrical hollow membrane having a hollow part formed therein along an axial direction, the hollow fiber membrane including: a first layer positioned at the outermost part so as to be exposed to the outside, and having pores formed therein to make raw water enter and leave via the pores; a second layer formed on the inside of the first layer to filter out contaminants from raw water as the raw water passes through; and a third layer to optionally separate or filter out contaminants from the raw water introduced through the second layer or introduced from the hollow part, wherein the first layer to the third layer are integrally formed; the first layer is formed at a position within 20 μm towards the inside from the outermost part; and the porosity thereof is 30 to 80%.

According to an exemplary embodiment of the present invention, the service life of a hollow fiber membrane may be prolonged by minimizing the filtration pressure loss depending on the cross-sectional structure of the hollow fiber membrane, and the removal performance of a contamination source may be maximized or an optional separation performance may be improved while high permeability may be simultaneously expected.

Furthermore, a high porosity layer may be formed on the cross-section of the outermost part of the hollow fiber membrane to facilitate washing of the membrane, so that stability may be secured even during the long-term operation, and economic efficiency may be enhanced.

MODES FOR CARRYING OUT THE PREFERRED EMBODIMENTS

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a drain device and a refrigerator having the same according to an embodiment, with reference to the accompanying drawings.

Hereinafter, a hollow fiber membrane according to an exemplary embodiment of the present invention will be described in more detail with reference to the drawings. In the present specification, like reference numbers are used to designate like constituents even though they are in different exemplary embodiments, and the description thereof will be substituted with the initial description.

Singular expressions used in the present specification include plural expressions unless they have definitely opposite meanings in the context.

The present invention has been made in an effort to increase a low strength and decrease the filtration pressure loss, the low strength and the filtration pressure loss being disadvantages which a hollow fiber membrane 100 has. The present invention increases the breaking strength and simultaneously maximizes the removal performance of contaminants because a layer having a low porosity at the hollow portion inside the hollow fiber membrane 100. Furthermore, the present invention relates to a hollow fiber membrane 100 which decreases the filtration pressure loss and maintains a high permeability by forming a network structure having a high porosity on the cross-section of the hollow fiber membrane 100 except for this.

Figure 1:
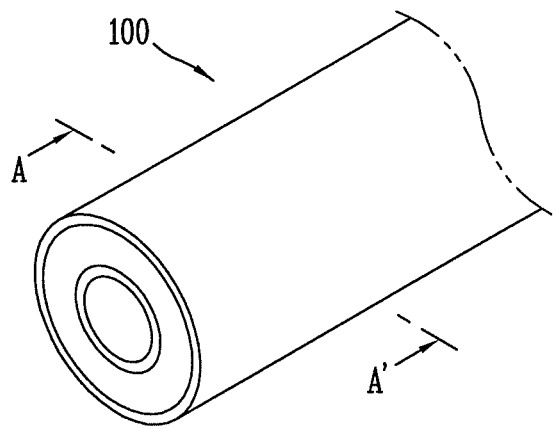
FIG. 1 is a perspective view of a hollow fiber membrane according to an exemplary embodiment of the present invention.
Figure 2:
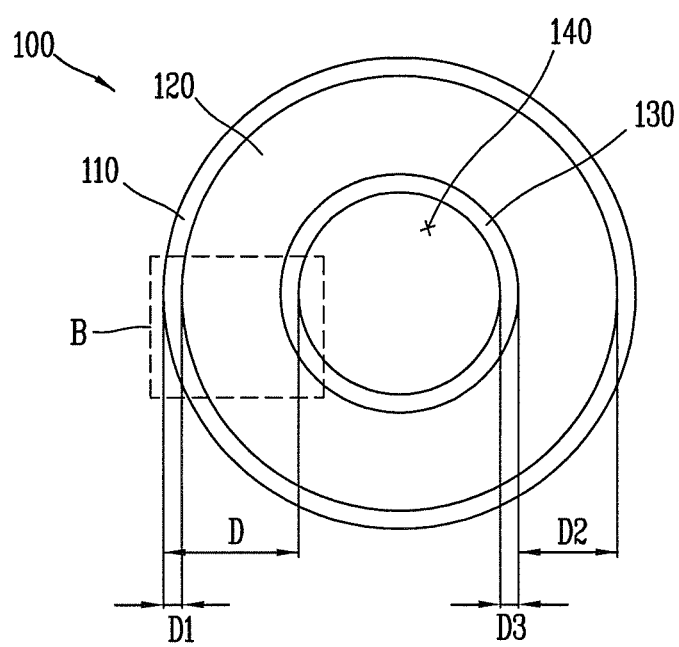
FIG. 2 is a cross-sectional view along the line AA' of FIG. 1.
Figure 3:
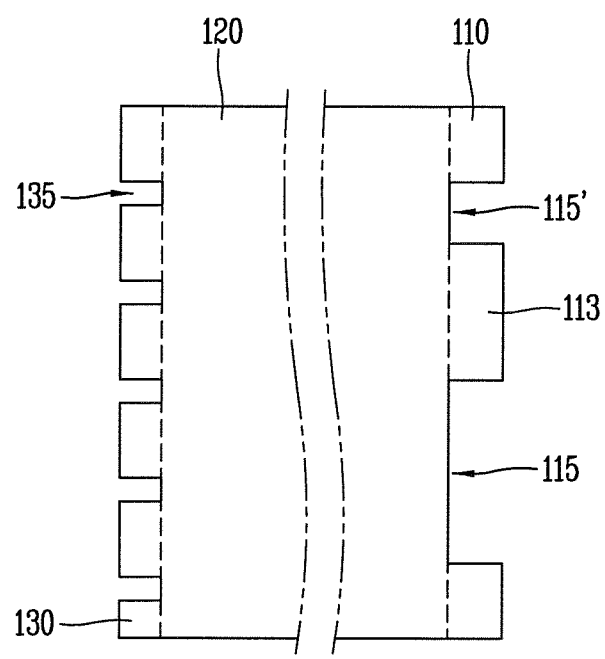
FIG. 3 is a detailed cross-sectional view of a portion B of FIG. 2.

First, FIG. 1 is a perspective view of a hollow fiber membrane 100 according to an exemplary embodiment of the present invention, FIG. 2 is a shape of a cross-section cut along the line AA' of FIG. 1, and FIG. 3 is an enlarged view of a portion B of FIG. 2.

Hereinafter, the hollow fiber membrane 100 according to an exemplary embodiment of the present invention with reference to FIGS. 1 to 3. The hollow fiber membrane 100 according to an exemplary embodiment of the present invention has a cylindrical shape having a hollow part 140 formed therein, and the porosities are different depending on the depth towards the hollow part 140 formed in the inner center.

On a first layer 110 which is positioned at the outermost part of the hollow fiber membrane 100 and thus is exposed to the outside, macropores 115 and pores 115' smaller than the macropores 115 are formed. FIG. 3 illustrates that the depths of the pores 115 and 115' are all the same as each other, but schematically shows the situation, and in fact, the depths of the pores 115 and 115' are all different from each other. Accordingly, the thickness will be described below, but the rough thickness D1 which may differentiate the first layer 110 needs to be defined. This also applies to the case of a third layer 130. That is, the average thickness D3 of the third layer 130 needs to be defined because the depths of pores 135 in FIG. 3 are all different from each other.

When a raw water including contaminants is introduced from the outside through the pores 115, 115', and 135, the contaminants are removed. In an exemplary embodiment of the present invention, the porosity of the first layer 110 is set at 30 to 80%. When the porosity of the first layer 110 is less than 30%, the first layer becomes a dense layer, and thus, the raw water is not smoothly introduced, and when the porosity is more than 80%, the layer may be easily peeled off when the layer is pressurized from the inside or outside, so that the porosity of the first layer 110 is limited to 30 to 80% in an exemplary embodiment of the present invention.

That is, a high porosity layer may be formed on the first layer 110 to decrease the filtration pressure loss and simultaneously, maintain the high permeability.

The contaminants are further filtered out while the raw water introduced into the inside of the hollow fiber membrane 100 through the first layer 110 is passing through a second layer 120. The second layer 120 is formed on the inside of the first layer 110, and has a porosity of 25 to 65%. When the porosity of the second layer 120 is less than 25%, the second layer becomes a dense layer, and thus, the raw water does not smoothly pass through and a clogging phenomenon may be generated, and when the porosity is more than 65%, the breaking strength is decreased, and thus, the hollow fiber membrane 100 may be easily broken. This is because it is the state where polymers are not connected to each other. That is, a network structure is formed in the second layer 120, and thus minimizes the filtration pressure loss, thereby contributing to the increase and maintenance of the permeation performance. In this case, the second layer 120 occupies the most part of the hollow fiber membrane 100 and has a thickness D2.

Furthermore, a third layer 130 called an active layer is formed at the innermost part of the hollow fiber membrane 100. The third layer 130 is a layer in which the raw water introduced through the second layer 120 or the raw water introduced from the hollow part 140 passes through, and thus, contaminants in the raw water are filtered out or optionally separated. The porosity of the third layer 130 is 25% or less, and the cross-sectional thickness D of the hollow fiber membrane 100 is allowed to occupy 10% or less. That is, a layer having a low porosity of 25% or less may be formed in the third layer 130 to increase the tensile strength and breaking strength of the hollow fiber membrane 100 and maximize the removal performance of a contamination source or maximize the optional permeation performance. In this case, the size of pores 135 formed on the third layer 130 is smaller than that of macropores 115 formed on the first layer 110. In this case, the average size of pores 135 formed on the third layer 130 is about 50 nm or less, and preferably, pores having a size of about 20 nm or less may be formed. Accordingly, it is possible to filter out contaminants including viruses having a size of about 20 nm or more.

As described above, the third layer 130 may refer to a layer exhibiting inherent characteristics of the hollow fiber membrane 100.

The purified water passing through the aforementioned first layer 110 to third layer 130 and introduced into the hollow part 140 may be used as drinking water and the like because most of the contaminants are filtered out.

In this case, the cross-sectional thickness D of the hollow fiber membrane 100 means a distance from the outermost part of the hollow part 140 formed on the inside of the hollow fiber membrane 100 to the surface of the first layer 110 of the hollow fiber membrane 100 exposed to the outside. In an exemplary embodiment of the present invention, the hollow fiber membrane 100 has a cross-sectional thickness D of 50 to 400 μm. The cross-sectional thickness D is not always limited thereto, and may be adjusted, if necessary. In addition, it is natural that the thickness of the third 130 may also vary depending on the change in cross-sectional thickness D of the hollow fiber membrane 100.

The first layer 110 to the third layer 130 are integrally formed, the porosity of the first layer 110 is formed to be larger than that of the third layer 130, and the porosity of the second layer 120 has a roughly value between the porosities of the first layer 110 and the third layer 130, but the present invention is not always limited thereto. That is, the porosity of the second layer 120 may also be larger than that of the first layer 110.

Further, a network structure formed of a polymer is present in the first layer 110 to the third layer 130, and the filtration pressure loss is minimized by adjusting the porosity as described above. In this case, the filtration pressure loss means a difference between a pressure (Pe) acting on the outside of the hollow fiber membrane 100 and a pressure (Pi) at the hollow part 140 of the hollow fiber membrane 100, and the lower filtration pressure loss is, the more sufficiently contaminants may be removed at even a small pressure, so that the filtration efficiency (permeation rate) is excellent.

In this case, the first layer 110 is formed within 20 μm towards the inside cross-section from the outermost part of the hollow fiber membrane 100 exposed to the outside, and the third layer 130 is formed within 20 μm towards the outside from the outermost part of the hollow part 140 in a radial direction.

Figure 4:
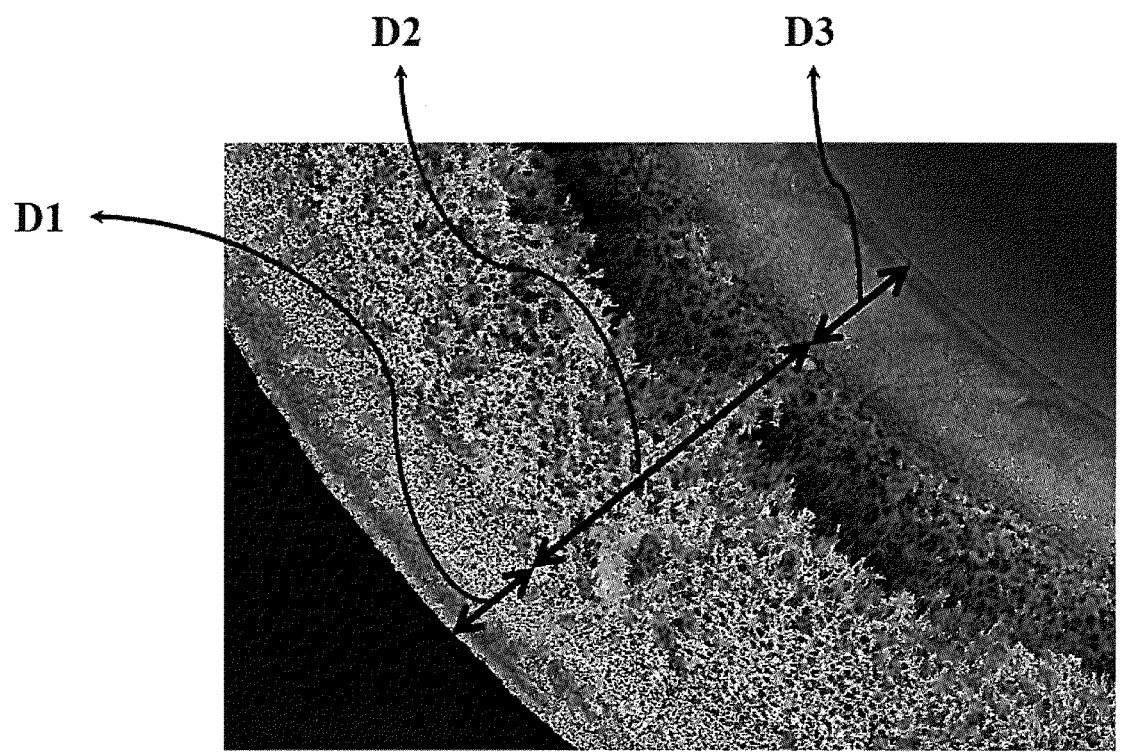
FIG. 4 is an SEM photograph of a portion B of FIG. 2.

FIG. 4 is an SEM photograph of a portion B of FIG. 2, and it can be seen that the thickness D2 of the second layer 120 formed at the middle portion thereof is largest, illustrating that the thickness D1 of the first layer 110 and the thickness D3 of the third layer 130 are similar to each other.

Figure 5:
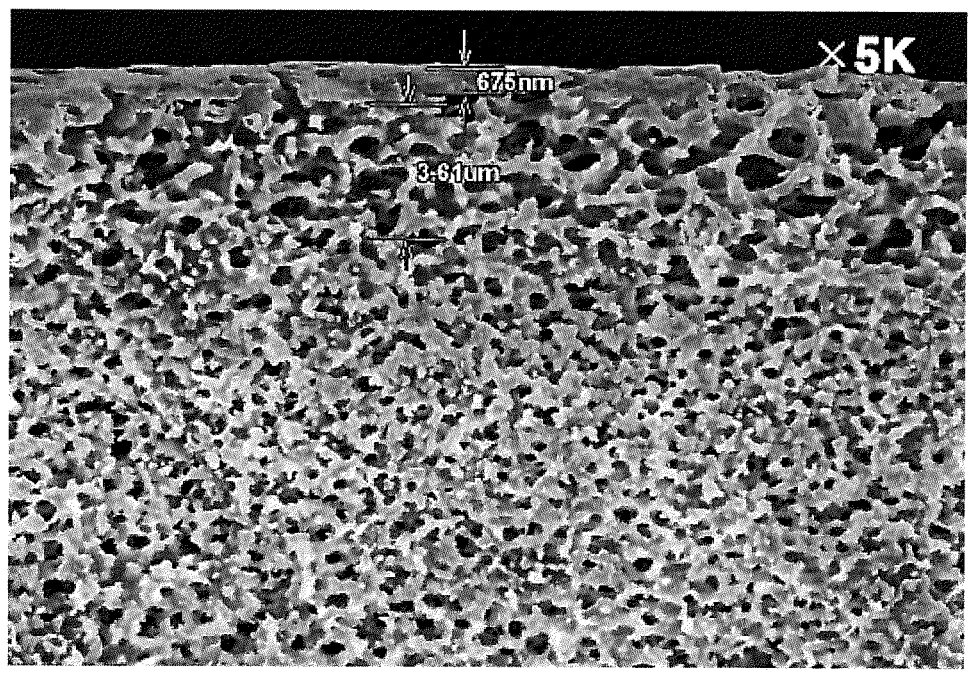
FIGS. 5 and 6 are SEM photographs enlarged by varying the magnification of the outermost layer of FIG. 4.
Figure 6:
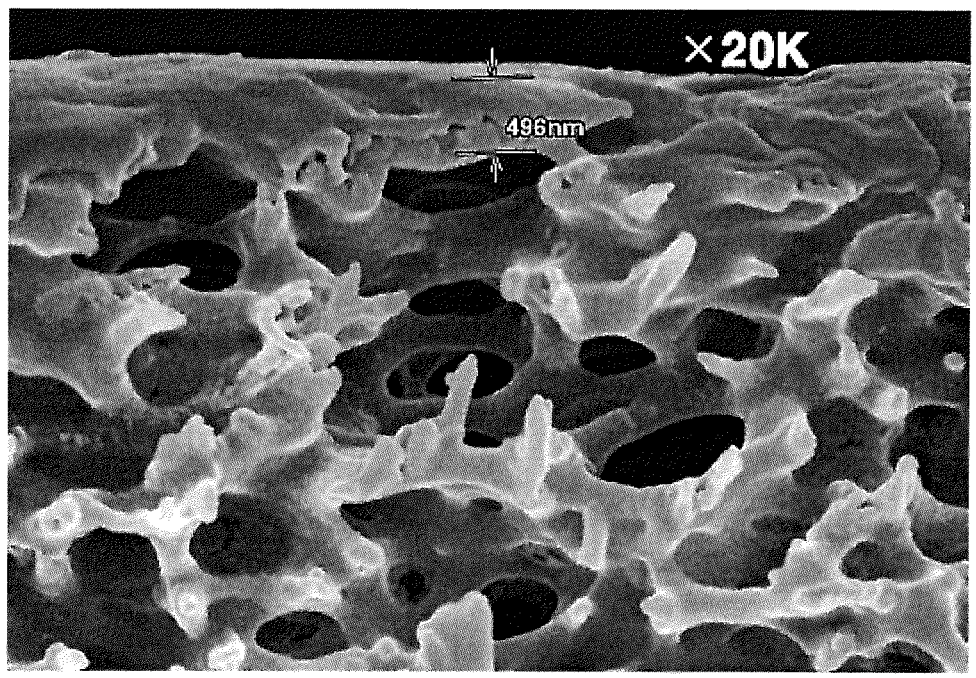

FIGS. 5 and 6 are enlarged SEM photographs of the outermost layer of FIG. 4, illustrating a network structure formed on the first layer 110 which is an outermost layer, FIGS. 5 and 6 are photographs taken by varying the magnification, and FIG. 6 is an SEM photograph taken at a higher magnification. The porosity is increased by the network structure as described above, thereby decreasing the filtration pressure loss.

Furthermore, the hollow fiber membrane may be formed of at least one of polysulfone, polyether sulfone, or a polymer using the same.

Hereinafter, exemplary embodiments in which the water permeability for the aforementioned hollow fiber membrane 100 was measured will be described.

For the measurement of water permeability, the amount of water permeating at the same area in a cross flow manner at 1 bar for a predetermined time was measured by manufacturing a pressurized module.

The first Example is about the case where the network structure formed on the first layer 110, which is an outermost layer, has a thickness of 15 to 20 μm, the second Example is about the case where the network structure formed on the first layer 110 has a thickness of 10 μm, and the third Example is about the case where the network structure formed on the first layer 100 has a thickness of 3 μm.

The water permeability in the first to fourth Examples was shown as 860 L/m² ·hr, 550 L/m² ·hr, and 350Lm² ·hr, respectively.

Meanwhile, in the case of the Comparative Example in which the water permeability of the hollow fiber membrane densely formed without a network structure in the first layer 110 under the experimental conditions which are the same as in the first to fourth Examples, the water permeability was shown as 130 L/m²·hr.

From the Examples and the Comparative Example, it can be confirmed that the larger the thickness of the network structure formed on the first layer 110 is, the higher the water permeability is, and it was confirmed that when the hollow fiber membrane has a dense layer without a network structure, the water permeability was lower than the aforementioned water permeability.

As described above, the porosities of the hollow fiber membrane 100 of the present invention are gradually decreased from the first layer to the third layer. The water permeability of the hollow fiber membrane structure of the present invention may be improved up to 1,600 L/m²·hr.

Figure 7:
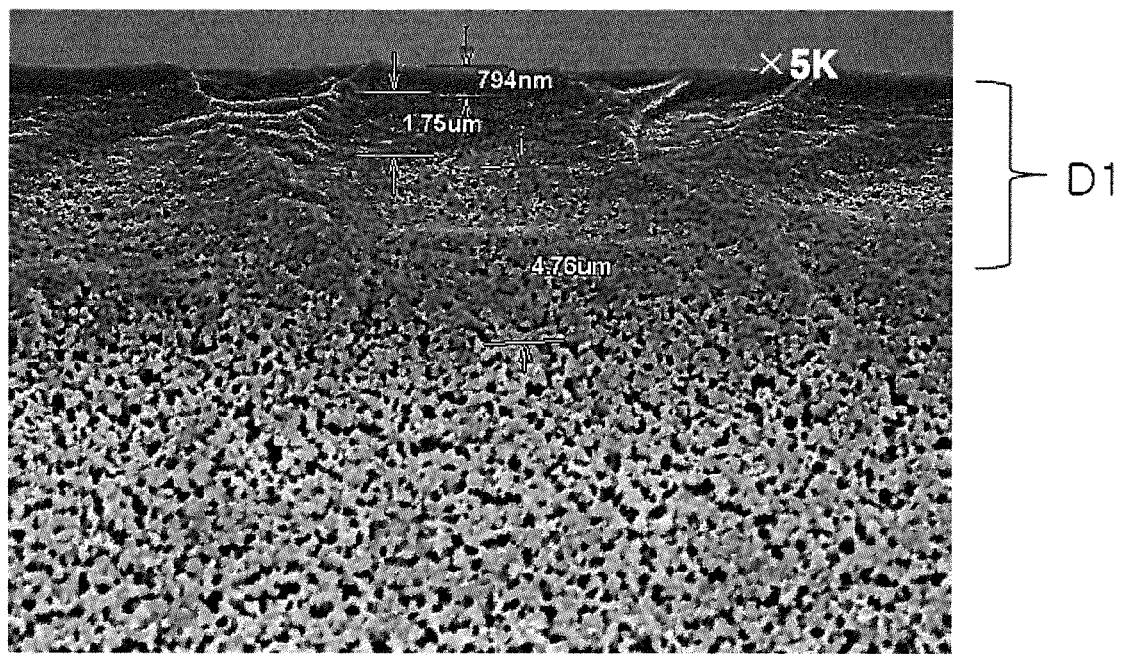
FIG. 7 is an SEM photograph of a hollow fiber membrane according to the Comparative Example.

The SEM photograph for the Comparative Example is illustrated in FIG. 7, and as illustrated in FIG. 7, it can be seen that when the first layer 11 is densely formed without a network structure, the porosity is decreased, and thus, the water permeability is rapidly decreased compared to the case of the first to third Examples.

The hollow fiber membrane as described above is not limited by the configurations and methods of the exemplary embodiments as described above, but the exemplary embodiments may also be configured by selectively combining a whole or part of the exemplary embodiments, such that various modifications can be made.

Further, it will be understood by those skilled in the art to which the present invention pertains that the present invention can be implemented in other concrete forms without modifying the technical spirit or essential features of the present invention.

Therefore, the exemplary embodiments described above should be understood as illustrative rather than limiting in all respects. The scope of the present invention is represented by the claims to be described below rather than the detailed description, and it is to be interpreted that the meaning and scope of the claims and all the changes or modified forms derived from the equivalent concepts thereof fall within the scope of the present invention.

The exemplary embodiments of the present invention may be applied to a hollow fiber membrane which controls the permeability by controlling the porosity.

The invention claimed is:

1. A cylindrical hollow fiber membrane having a hollow chamber formed therein along an axial direction, the hollow fiber membrane comprising:
    a first layer positioned so as to be exposed to an outside of the hollow fiber membrane, and having pores formed therein to permit fluid to enter and leave the first layer via the pores;
    a second layer formed inside of the first layer to filter out contaminants from fluid passing through the second layer; and
    a third layer to optionally separate or filter out contaminants from fluid introduced into the third layer through the second layer or from the hollow chamber, wherein the first layer has a porosity of 30 to 80%, the second layer has a porosity of 25 to 65%, and the third layer has a porosity of 25% or less;

wherein the porosities are decreased from the first layer to the third layer wherein the first layer, second layer, and the third layer have a network structure formed of polymer, wherein the network structure formed in the first layer has a thickness of 3 to 20 μm, wherein the first layer has a thickness up to 20 μm towards the hollow chamber from an outermost surface of the first layer, and wherein the third layer has a thickness up to 20 μm towards the outside of the hollow fiber membrane from the hollow chamber in a radial direction wherein the cylindrical hollow fiber membrane has a water permeability in the range of 350 L/m$^2$·hr to 1600 L/m$^2$·hr.

2. The hollow fiber membrane of claim 1, wherein the hollow fiber membrane is formed of at least one of polysulfone, polyether sulfone, or another polymer using at least one of polysulfone or polyether sulfone.

3. The hollow fiber membrane of claim 1, wherein the hollow fiber membrane has a thickness of 50 to 400 μm.

4. The hollow fiber membrane of claim 1, wherein the third layer has an average pore size of 50 nm or less.

5. The hollow fiber membrane of claim 4, wherein the third layer has an average pore size of 20 nm or less.

* * * * *